UNITED STATES PATENT OFFICE

ERIK LUDVIG RINMAN, OF DJURSHOLM, SWEDEN

PROCESS OF PRODUCING PURE ALUMINUM HYDRATE PARTICULARLY FROM ALUMINUM-CONTAINING RAW MATERIALS RICH IN SILICA

No Drawing. Application filed November 14, 1925, Serial No. 69,191, and in Sweden November 22, 1924.

The present invention relates to a process of producing pure aluminum hydrate. The present process is particularly adapted for the production of such hydrate from raw materials rich in aluminum of the kind which owing to their high percentage of silica can not suitably be treated according to Bayer's soda lye process, but the process may of course also be utilized for the treatment of raw materials poor in silica.

The process consists principally in that from the aluminum-containing raw material an aluminum sulphate solution is first produced according to well-known methods, and in this conection it is to be observed that a high percentage of iron in said solution does does not render the following operations more dificult in a degree worth mentioning. The said solution is afterwards mixed, preferably in a hot state, with a solution of sodium sulphydrate, which may contain sodium sulphide, and which is also preferably in a hot state, in approximately such quantities that all aluminum is precipitated as hydrate, while liberating hydrogen sulphide which latter may be taken care of separately. Afterwards the aluminum hydrate thus obtained, which possibly contains iron, is separated from the sodium sulphate solution and the sodium sulphydrate possibly remaining in said solution, so that an aluminum hydrate free from sulphuric acid to the desired degree is obtained.

In order from this impure aluminum hydrate to produce pure aluminum hydrate the following course is adopted, according to the invention:

The impure aluminum hydrate is dissolved in a solution of sodium sulphide so as to form sodium aluminate and sodium sulphydrate, after which the undissolved residue of FeS and other impurities is separated, and the mixed sodium aluminate and sodium sulphydrate solution thus obtained is treated, preferably in a hot state, with hydrogen sulphide. All aluminum hydrate is then precipitated, provided that a sufficient quantity of hydrogen sulphide gas is introduced. The hydrate thus precipitated is afterwards separated from the sodium sulphydrate solution by filtration and washing, so that pure aluminum hydrate is obtained. The sodium sulphydrate solution thus obtained may afterwards be used for precipitating impure aluminum hydrate from an aluminum sulphate solution in the manner above described. The reactions take place according to the following formulæ, the iron in the clay, and $SiO_2$ and $CO_2$ in the sodium sulphide solution being disregarded:

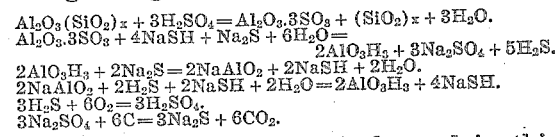

Theoretically, the chemicals used in this process may thus be completely recovered, but in practice there will of course be some losses. If there is iron present in the aluminum sulphate solution, such iron will be obtained in the state of FeS, from which the sulphur may be recovered, however, by burning, in the state of $SO_2$, from which $H_2SO_4$ may be produced. In practice, a quantity of sulphuric acid will, of course, be lost, which quantity is suitably replaced by purchased acid, or by sulphur dioxide or sulphuric acid produced by burning sulphur or pyrite. Sodium lost is suitably replaced by sodium sulphate.

In order to illustrate the invention an example of the manner in which the present process may be carried out, is described here below. It is assumed that ordinary clay free from lime is used as raw material. On the other hand, the clay is assumed to contain iron. From said clay an aluminum sulphate solution is first produced, by treating the clay in well-known manner with sulphuric acid, so that an aluminum sulphate solution approximately 100° C. hot is obtained, the concentration of which corresponds to saturation at about 90° C., and the percentage of iron of which with relation to $Al_2O_3$ may amount to 5 percent $Fe_2O_3$ or more.

A measured quantity of the above-mentioned aluminum sulphate solution, approximately 100° C. hot, is pumped through one or more pipes into a measured solution of sodium sulphydrate, also 100° C. hot, which is estimated in such manner that for each molecule $SO_4$ in the sulphate solution there are two molecules NaSH in the sodium sulphydrate solution, preferably with a slight excess of NaSH so that all aluminum will be completely precipitated as hydrate. The sodium sulphydrate solution may also contain some sodium sulphide, if desired. During this process the sodium sulphydrate solution is preferably maintained in a lively movement, for instance in an ordinary closed mixing apparatus. During the process a quantity of $H_2S$ equivalent to the quantity of sulphuric acid is given off in gaseous state. A precipitate of $$AlO_3H_3 + FeS + Na_2O.Al_2O_3.SiO_2 + 9H_2O$$

etc. is formed, and in the solution $Na_2SO_4$, all in equivalent quantities, and the solution also contains the excess of NaSH. The hydrogen sulphide is drawn off in order partly to be used for the purpose below specified, and partly to be transformed into sulphuric acid by burning in well-known manner, for the purpose of supplying the greater portion of the quantity of such acid required in the process. The aluminum hydrate precipitate obtained in this manner is very easily filtered, provided that the aluminum sulphate solution was introduced in the sodium sulphydrate solution, and not vice versa, so that it is possible to use, practically speaking, all conceivable filtering devices for separating the precipitate from the sodium sulphate solution. Since, however, it is not particularly important to wash away completely all sodium sulphate from the precipitate, the filtration and washing may suitably be effected by means of continuously operating, for instance rotary, filters. The sodium sulphate solution thus obtained is evaporated, and the sodium sulphate obtained is reduced, mixed with a further quantity of sodium sulphate if desired, to make up for the losses in the manufacture, so that sodium sulphide is again obtained, which is again introduced into the process in an operation below described.

The aluminum hydrate precipitate obtained by the filtration, and which contains iron sulphide and possibly also sodium sulphate, is afterwards dissolved, for instance in a closed mixing apparatus, which should preferably be provided with a heating device for direct steam, and which contains sodium sulphide solution at a temperature of about 100° C. The solution is maintained at the boiling point, or above the same, as long as aluminum hydrate is dissolved. Theoretically, there would only be required for such dissolution such quantity of $Na_2S$-solution that for one molecule $Al_2O_3$ there are two molecules $Na_2S$. Owing to the fact, however, that as a rule the $Na_2S$-solution contains some carbonate and sulphate and owing to the fact that there is not formed $NaAlO_2$ exclusively, but as a rule also some $Na_3O_3Al$, some more sodium sulphide solution should be used, as a rule probably three molecules $Na_2S$, that is to say, the entire quantity of sodium sulphide that according to the formulæ is theoretically required for carrying out the process, and which quantity will thus circulate, so to speak, in this manufacture. When all aluminum that can be dissolved, has been dissolved, the undissolved iron sulphide and other impurities are filtered away, and the filtrate thus obtained is precipitated at a temperature of about 100° C. by the introduction of hydrogen sulphide gas, preferably such gas as has been obtained in a preceding operation. As soon as in this manner all aluminum has been precipitated as hydrate, the operation is ready. The precipitated aluminum hydrate, which is particularly easily filtered, is afterwards completely separated from the sodium sulphydrate solution by filtration and washing, for instance in suction filters or pressure filters. The washing, which should preferably be effected with hot washing liquids and hot water, is continued—without taking care of the thinnest filtrate, if desired—until the precipitate becomes chemically free from sulphur. The aluminum hydrate thus produced has now obtained a sufficient purity, for instance for the production of pure aluminum oxide. For this it is of course a condition that the sodium sulphide solution used is of the desired purity. Carbonate possibly present in the sodium sulphide solution may of course be removed to the greater part by causticizing with lime and subsequent filtering away of the precipitated carbonate.

The sodium sulphydrate solution obtained in this operation is utilized in the manner above described for the production of aluminum hydrate from the aluminum sulphate solution, and so forth. Theoretically there would only be required for the precipitation of the pure aluminum hydrate with $H_2S$ two-fifths of the quantity formed at the first precipitation of aluminum hydrate, but in practice there will probably be required up to about half of said quantity.

It will be obvious to those skilled in the art that all sodium compounds used in the present process may be replaced by the corresponding potassium compounds, and the term "sodium" used in the claims should therefore be understood as being equivalent to potassium.

I claim:

1. The process of producing pure aluminum hydrate, particularly from aluminum-containing raw materials rich in silica, which consists in treating the aluminum-containing raw material with sulphuric acid for producing aluminum sulphate solution, treating said aluminum sulphate solution with sodium sulphydrate solution for producing impure aluminum hydrate and sodium sulphate and hydrogen sulphide, separating said sodium sulphate and hydrogen sulphide from said impure aluminum hydrate, dissolving said impure aluminum hydrate in sodium sulphide solution so as to form sodium aluminate and sodium sulphydrate, filtering off undissolved residue and precipitating pure aluminum hydrate from the mixed sodium aluminate and sodium sulphydrate solution obtained by treating said solution with hydrogen sulphide and separating such pure aluminum hydrate from the sodium sulphydrate solution formed.

2. The process according to claim 1, in which the aluminum sulphate solution is treated with sodium sulphydrate solution containing sodium sulphide.

3. The process according to claim 1, in which the precipitation of the impure aluminum hydrate from the aluminum sulphate solution is effected in such manner that hot aluminum sulphate solution is introduced into hot sodium sulphydrate solution.

4. The process according to claim 1, in which the precipitation of the pure aluminum hydrate with hydrogen sulphide gas is effected under heat.

5. The process according to claim 1, in which the sodium sulphate solution obtained is evaporated and used for the production of sodium sulphide, which is again used for the manufacture, loss of sodium sulphide being supplied by sodium sulphide simultaneously produced from further quantities of sodium sulphate.

6. The process according to claim 1, in which the impure aluminum hydrate is dissolved in sodium sulphide solution at a temperature of substantially 100° C.

ERIK LUDVIG RINMAN.